(12) United States Patent
Yamakawa et al.

(10) Patent No.: US 6,624,299 B2
(45) Date of Patent: Sep. 23, 2003

(54) PROCESS FOR PRODUCING CELLULOSE ACETATE

(75) Inventors: Katsuyoshi Yamakawa, Kanagawa (JP); Koushin Matsuoka, Kanagawa (JP); Tadahisa Sato, Kanagawa (JP)

(73) Assignee: Fuji Photo Film Co., Ltd., Minami Ashigara (JP)

( * ) Notice: Subject to any disclaimer, the term of this patent is extended or adjusted under 35 U.S.C. 154(b) by 0 days.

(21) Appl. No.: 09/774,564

(22) Filed: Feb. 1, 2001

(65) Prior Publication Data

US 2001/0011132 A1 Aug. 2, 2001

(30) Foreign Application Priority Data

Feb. 1, 2000 (JP) ..................................... P.2000-024360

(51) Int. Cl.[7] .............................. C08B 3/06; C07H 1/00
(52) U.S. Cl. ........................... 536/69; 536/56; 536/124
(58) Field of Search ............................ 536/69, 56, 124

(56) References Cited

U.S. PATENT DOCUMENTS

| | | | | | |
|---|---|---|---|---|---|
| 4,234,718 A | * | 11/1980 | Brown | .......................... | 536/69 |
| 4,234,719 A | * | 11/1980 | Wan | ............................. | 536/69 |
| 5,869,646 A | * | 2/1999 | Yamashita | .................... | 536/69 |

OTHER PUBLICATIONS

Xie et al, "Enzyme–catalyzed Transesterification on Cellulose"; *Fiber and Polymer Science*, University of California, Davis CA 95616, pp. 406–107.

* cited by examiner

*Primary Examiner*—James O. Wilson
*Assistant Examiner*—Everett White
(74) *Attorney, Agent, or Firm*—Burns, Doane, Swecker & Mathis, LLP

(57) ABSTRACT

A process for producing cellulose acetate by acetylation reaction with cellulose as a raw material, wherein acetate is used as an acetylating agent.

10 Claims, No Drawings

PROCESS FOR PRODUCING CELLULOSE ACETATE

FIELD OF THE INVENTION

The present invention relates to a process for producing cellulose acetate and more specifically relates to a process for producing cellulose acetate comprising the step of the reaction using an acetate as an acetylating agent.

BACKGROUND OF THE INVENTION

Cellulose acetate has been used for a variety of purposes such as fibers for clothing, tobacco filter chips, plastics, films and coatings, and the output of cellulose acetate is the most of cellulose derivatives, hence cellulose acetate is industrially important compound.

A cellulose acetate film has been used as the support of a photographic material on one hand, due to its optical isotropy it has also been used in recent years for a liquid crystal display device which is extending the market. A cellulose acetate film is in general produced by a solvent casting method. The degree of acetylation of cellulose acetate is closely related with the mechanical strength and the durability of the film obtained, and it is known that as the degree of acetylation of cellulose acetate lowers, the qualities which are required of the optical film such as the modulus of elasticity and the dimensional stability of the film are reduced. For ensuring satisfactory qualities of the product, cellulose acetate should have the degree of acetylation of 58% or more, preferably 59% or more. Cellulose acetate having the degree of acetylation of 58% or more is generally classified as cellulose triacetate (triacetyl cellulose, i.e., TAC). In a solvent casting method, a solution containing cellulose acetate dissolved in a solvent (a dope) is cast-coated on a support and the solvent is evaporated to thereby form a film.

It is important that a solvent for use in a solvent casting method not only has high solubility but also easily evaporates and scarcely remains in a film. Methylene chloride has so far been used as a solvent for this purpose but the use of methylene chloride has come to be restricted from the environmental point of view. Therefore, searching out an alternative solvent is now an important problem, and a method of using an organic solvent containing acetone as a main component and dissolving cellulose acetate by cooling to thereby obtain a cellulose acetate film (JP-A-9-95544 (the term "JP-A" as used herein means an "unexamined published Japanese patent application")), and a method of producing a cellulose acetate film with an organic solvent containing acetone as a main component under high pressure condition of from 1 to 500 MPa (JP-A-11-21379) have been suggested.

Representative industrial production method of cellulose acetate includes a method using an acetic anhydride as an acetylating agent, an acetic acid as a diluent and a sulfuric acid as a catalyst (e.g., JP-A-5-239101 can be referred to). This method comprises the steps of (1) a pretreatment process of disaggregating and cracking a pulp material and then spraying acetic acid and mixing with the pulp material, (2) an acetylation process of reacting the pretreated pulp by using an acetylating agent, a diluent and a catalyst and, if necessary, (3) an aging process of hydrolyzing the cellulose acetate to make cellulose acetate having a desired degree of acetylation, and (4) a post treatment process of precipitating and dissociating the cellulose acetate having undergone the aging reaction from the reaction solution, refining, stabilizing and drying.

It has been tried to produce solutions containing cellulose acetate produced by the above-described ordinary method with solvents other than methylene chloride. However, according to the above method of using an organic solvent containing acetone as a main component (disclosed in JP-A-9-95544), a cellulose acetate solution (a dope) excellent in storage stability cannot be obtained from cellulose acetate having high degree of acetylation, preferably 61% or so, and such is the state of things that cellulose acetate which can be used has low degree of acetylation. Further according to the method disclosed in JP-A-11-21379, such severe pressure as 100 MPa at 25° C. is required.

SUMMARY OF THE INVENTION

An object of the present invention is to provide a process for producing cellulose acetate which is suitable for preparing a cellulose acetate solution (a dope) by using an organic solvent other than methylene chloride under more moderate conditions.

The above object of the present invention has been accomplished by the following means.

(1) A process for producing cellulose acetate which comprises reacting cellulose as a raw material with an acetylating agent, wherein the acetylating agent is an acetate.

(2) The process for producing cellulose acetate as described in the above item (1), wherein a solid acid catalyst is used in the reaction as a catalyst.

(3) The process for producing cellulose acetate as described in the above item (1) or (2), wherein the acetate is methyl acetate or ethyl acetate.

(4) The process for producing cellulose acetate as described in the above item (1), (2) or (3), wherein the reaction for acetylation is performed under the condition of pressure of 0.2 MPa or more.

DETAILED DESCRIPTION OF THE INVENTION

The cellulose used as a raw material in the present invention is more specifically cotton linter or wood pulp.

Cotton linter and wood pulp may be used by mixture. Wood pulp is more inexpensive and economical than cotton linter.

An ordinary process for producing cellulose acetate by using wood pulp is described below. In the first place, wood pulp is treated with a cracking machine to make fluffy cracked pulp. In the pretreatment of the cracked pulp, it is preferred for 100 g of the cracked pulp to be sprayed and mixed with from about 400 to about 1,000 g of a glacial acetic acid, in some cases containing a catalyst (e.g., a sulfuric acid), and stirred in a closed vessel with a stirrer at temperature of from 20 to 80° C. for from 0.5 to 4 hours or so. Such pretreatment is performed for the purpose of swelling the cellulose fiber to ensure smooth and uniform acetylation reaction to the cellulose.

Subsequently, from 150 to 800 g, preferably from 200 to 400 g, of an acetic anhydride as an acetylating agent is added to 100 g of the cracked pulp, stirred and mixed. The content in the reaction vessel generates heat due to the reaction. The temperature is adjusted so as to increase at an almost constant rate over 20 to 60 minutes, and the final temperature of from 50 to 80° C. is retained for a period of from 3 to 20 minutes to thereby acetylate the cellulose.

In the present invention, acetate (preferably those having from 3 to 18 carbon atoms, more preferably from 3 to 10 carbon atoms, e.g., methyl acetate and ethyl acetate) is used as an acetylating agent. Acetate is used preferably in an amount of 100 wt % or more based on the cracked pulp, more preferably from 100 to 20,000 wt %, and still more preferably from 300 to 1,000 wt %, with serving also as a diluent at the same time.

It is particularly preferred in the present invention to make an acetate solution without using other organic solvents and diluents but, if necessary, other organic solvents can be used, e.g., a halogen-based solvent, a hydrocarbon-based solvent, an alcohol-based solvent and an acetic acid can be used. When these solvents are used, the use amount is preferably from 1 to 1,000 wt % based on the cracked pulp.

As a catalyst, a sulfuric acid, a hydrochloric acid, a hydrobromic acid, and a perchloric acid are preferably used in the present invention, more preferably a sulfuric acid. A solid acid catalyst can also be preferably used in the present invention. Specific examples of solid acid catalysts include, e.g., an acid ion exchange resin, an acid clay, and a silica alumina. The solid acid catalyst has been improved variously in recent years (e.g., the solid acid catalysts disclosed in JP-A-5-261298, JP-A-6-182212, JP-A-6-327976, JP-A-7-47280, JP-A-7-171397, JP-A-8-57321, JP-A-8-126842, JP-A-8-126843, JP-A-9-75735, JP-A-9-103681, JP-A-10-809727, JP-A-11-57478, JP-A-11-188261, JP-A-11-244701, JP-A-11-309375, etc.). Although the solid acid catalysts disclosed in the above patents can be used in the present invention, it is preferred to use an acid ion exchange resin. As an acid ion exchange resin, Amberlyst 15 (a trade name), Amberlite IRP64 (a trade name), AMBERJET 1200 (a trade name), and Nafion (a trade name) are preferably used. A catalyst is used in an amount of preferably from 0.1 to 2,000 wt %, more preferably from 1 to 1,000 wt %, and still more preferably from 10 to 100 wt %, based on the cracked pulp. When a solid acid catalyst is used, it can be dissociated by filtration and the like after the reaction.

The acetylation reaction is preferably performed in an autoclave under high pressure of 0.2 MPa or more, more preferably from 4 to 30 MPa.

The critical point of an acetic acid is 5.79 PMa at 319° C., the critical point of an isobutyl acetate is 3.16 MPa at 288° C., the critical point of an ethyl acetate is 3.83 MPa at 250° C., the critical point of a butyl acetate is 3.11 MPa at 306° C., the critical point of a propyl acetate is 3.33 MPa at 276° C. and the critical point of methyl acetate is 4.69 MPa at 233° C., and it is preferred to perform pretreatment and esterification in a subcritical or supercritical condition in the vicinity of critical points. If necessary, a carbon dioxide (critical point is 7.38 MPa at 31° C.) may coexist in an autoclave.

The thus-obtained cellulose acetate solution (a dope) can be cast-coated on a support and the solvent is evaporated to thereby form a film. If necessary, a low molecular weight cellulose acetate can be removed.

The method of esterifying cellulose by using esters under high pressure can be applied not only to the manufacture of cellulose acetate but also to the manufacture of fatty acid cellulose such as cellulose propionate and cellulose butyrate.

According to the method of the present invention, cellulose acetate which is suitable for preparing a cellulose acetate solution (a dope) can be produced with an organic solvent other than methylene chloride under more moderate conditions. Further, an acetate solution of cellulose acetate can be obtained by a short process according to the present invention.

EXAMPLE

The present invention is more specifically described below with referring to examples, but it should not be construed as the present invention is limited thereto.

Example 1

Wood pulp (an α-cellulose content: 87.5%) was cracked by a home mixer in water, then substituted with acetone and dried. One (1) gram of this pulp was charged in an autoclave having a capacity of 500 ml, 160 g of a glacial acetic acid containing 0.5 g of a sulfuric acid was uniformly sprayed on the cracked wood pulp, and the content of the autoclave was stirred at 40° C. for 2 hours. One hundred and sixty (160) grams of methyl acetate was added thereto and the reaction mixture was allowed to react at 200° C., 4 MPa for 10 hours. After the temperature of the reaction solution was lowered to ordinary temperature, methyl acetate was distilled off, insoluble matters were recovered by centrifugation (7,000 rpm for 30 minutes), and the insoluble residue in the obtained cellulose acetate determined was 5.6%. The obtained product was a primary cellulose acetate product excellent in filterability and transparency. The degree of acetylation of the cellulose acetate was about 58%. The obtained cellulose acetate could be easily dissolved in organic solvents such as acetone and methyl acetate.

Example 2

Wood pulp (an α-cellulose content: 87.5%) was cracked by a home mixer in water, then substituted with acetone and dried. One (1) gram of this pulp was charged in an autoclave having a capacity of 500 ml, 0.5 g of Nafion (a trade name) and 200 g of methyl acetate were added thereto and the mixed solution was allowed to react at 250° C., 5 MPa for 24 hours. After the temperature of the reaction solution was lowered to ordinary temperature, Nafion was filtered out, thus a methyl acetate solution containing cellulose acetate was obtained. The degree of acetylation of the cellulose acetate was about 57%. The cellulose acetate obtained by the same treatment as in Example 1 was easily dissolved in organic solvents and the same stable solution (the dope) as in Example 1 could be obtained.

While the invention has been described in detail and with reference to specific examples thereof, it will be apparent to one skilled in the art that various changes and modifications can be made therein without departing from the spirit and scope thereof.

This application is based on Japanese patent application No. 2000-024360 filed on Feb. 1, 2000, the entire contents of which incorporated herein by reference.

What is claimed is:

1. A process for producing cellulose acetate which comprises reacting cellulose as a raw material with an acetylating agent, wherein the acetylating agent is an acetate.

2. The process for producing cellulose acetate as claimed in claim 1, wherein a solid acid catalyst is used in the reaction as a catalyst.

3. The process for producing cellulose acetate as claimed in claim 2, wherein the solid acid catalyst is an acid ion exchange resin.

4. The process for producing cellulose acetate as claimed in claim 1, wherein said acetate is methyl acetate or ethyl acetate.

5. The process for producing cellulose acetate as claimed in claim 1, wherein said reaction for acetylation is performed under the condition of pressure of 0.2 MPa or more.

6. The process for producing cellulose acetate as claimed in claim 1, wherein said reaction for acetylation is performed under the condition of pressure of 4 to 30 MPa.

7. The process for producing cellulose acetate as claimed in claim 1, wherein the cellulose is provided in the form of a cracked pulp, and wherein the acetate is present in an amount of 100 wt % or more based on the cracked pulp.

8. The process for producing cellulose acetate as claimed in claim 7, wherein the cellulose is provided in the form of a cracked pulp, and wherein the acetate is present in an amount of 100 to 20,000 wt % based on the cracked pulp.

9. The process for producing cellulose acetate as claimed is claim 8, wherein the cellulose is provides in the form of a cracked pulp, and wherein the acetate is present in an amount of 300 to 1,000 wt % based on the cracked pulp.

10. The process for producing cellulose acetate as claimed in claim 1, wherein the cellulose acetate has a degree of acetylation of 57% or more.

* * * * *